US007983212B2

(12) United States Patent
Ravi et al.

(10) Patent No.: US 7,983,212 B2
(45) Date of Patent: Jul. 19, 2011

(54) INTEGRATION OF EXTERNAL LOCATION ENGINE USING SWITCH

(75) Inventors: Ranjith Ravi, San Jose, CA (US); Saurabh Bhargava, San Jose, CA (US); Shilpa Moghe, San Jose, CA (US); Ajay Malik, Santa Clara, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 989 days.

(21) Appl. No.: 11/848,701

(22) Filed: Aug. 31, 2007

(65) Prior Publication Data
US 2009/0059813 A1    Mar. 5, 2009

(51) Int. Cl.
*H04W 4/00* (2009.01)
(52) U.S. Cl. .......................................... 370/328
(58) Field of Classification Search .................. 370/335, 370/395, 401, 338, 328, 389, 392, 254; 455/456, 455/522, 553; 340/505, 539, 825
See application file for complete search history.

(56) References Cited

U.S. PATENT DOCUMENTS

| | | | |
|---|---|---|---|
| 5,771,275 A * | 6/1998 | Brunner et al. ............... | 370/385 |
| 5,973,643 A | 10/1999 | Hawkes et al. | |
| 6,252,867 B1 * | 6/2001 | Pfeil et al. .................... | 370/335 |
| 7,130,641 B1 * | 10/2006 | Al-Khashti et al. ....... | 455/456.1 |
| 2005/0030160 A1 | 2/2005 | Goren et al. | |
| 2005/0078663 A1 * | 4/2005 | Sylvain ......................... | 370/352 |
| 2006/0025158 A1 * | 2/2006 | Leblanc et al. ............ | 455/456.2 |
| 2006/0132304 A1 * | 6/2006 | Cabell ...................... | 340/539.23 |
| 2006/0245399 A1 * | 11/2006 | Holur et al. .................. | 370/335 |
| 2006/0261938 A1 * | 11/2006 | Lai et al. ...................... | 340/505 |
| 2007/0188342 A1 * | 8/2007 | Valeriano et al. ........ | 340/825.49 |
| 2007/0270165 A1 * | 11/2007 | Poosala ..................... | 455/456.3 |
| 2007/0270166 A1 * | 11/2007 | Hampel et al. ............ | 455/456.3 |

FOREIGN PATENT DOCUMENTS

| WO | 2006087716 A1 | 8/2006 |
|---|---|---|
| WO | 2007064747 A1 | 6/2007 |

OTHER PUBLICATIONS

International Search Report PCT/US2008/074629 dated Dec. 30, 2008.

* cited by examiner

*Primary Examiner* — Hassan Phillips
*Assistant Examiner* — Prenell P Jones

(57) ABSTRACT

An RF switch is provided. The RF switch includes a processor adapted for communication with an external location engine. The processor is configured to receive notification regarding a status of a wireless asset, receive a plurality of input variables associated with the wireless asset, determine whether the wireless asset is associated with the external location engine, and if the wireless asset is associated with the external location engine, query the external location engine for location data associated with the wireless asset.

21 Claims, 3 Drawing Sheets

INTEGRATION OF EXTERNAL LOCATION ENGINE USING SWITCH

FIELD OF THE INVENTION

The present invention generally relates to radio frequency (RF) devices, and more particularly relates to a method and system for the integration of external location engines into a network using a switch.

BACKGROUND OF THE INVENTION

Radio frequency (RF) devices such as switches, access points, ports and radio frequency identification (RFID) systems are becoming more commonplace in today's society. These RF devices increasingly utilize a variety of RF technologies, such as the emerging "Worldwide Interoperability for Microwave Access" (WiMAX) standard, or the Zigbee communications standard (based on the 802.15.4 specification). Additionally an increasing number of devices use radio frequency identification (RFID), or the 802.11 family of specifications.

RF devices are generally associated with one or more networks. Such networks use switching devices, among other components, to route data from one location to another. As RF devices proliferate, it is increasingly desirable to be able to locate such devices using network components like switches that are compatible with a wide variety of RF technologies, standards and protocols.

BRIEF SUMMARY OF THE INVENTION

In one embodiment, by way of example only, an RF switch is provided. The RF switch includes a processor adapted for communication with an external location engine. The processor is configured to receive notification regarding a status of a wireless asset, receive a plurality of input variables associated with the wireless asset, determine whether the wireless asset is associated with the external location engine, and if the wireless asset is associated with the external location engine, query the external location engine for location data associated with the wireless asset.

In another embodiment, again by way of example only, a system is provided for facilitating communication between an RF switch and an external location engine. The system comprises means for receiving notification from a network resource regarding a status of a wireless asset, means for receiving a plurality of input variables associated with the wireless asset from the network resource, means for determining whether the wireless asset is associated with the external location engine, and means for querying the external location engine for location data associated with the wireless asset if the wireless asset is associated with the external location engine.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

Figure 1:
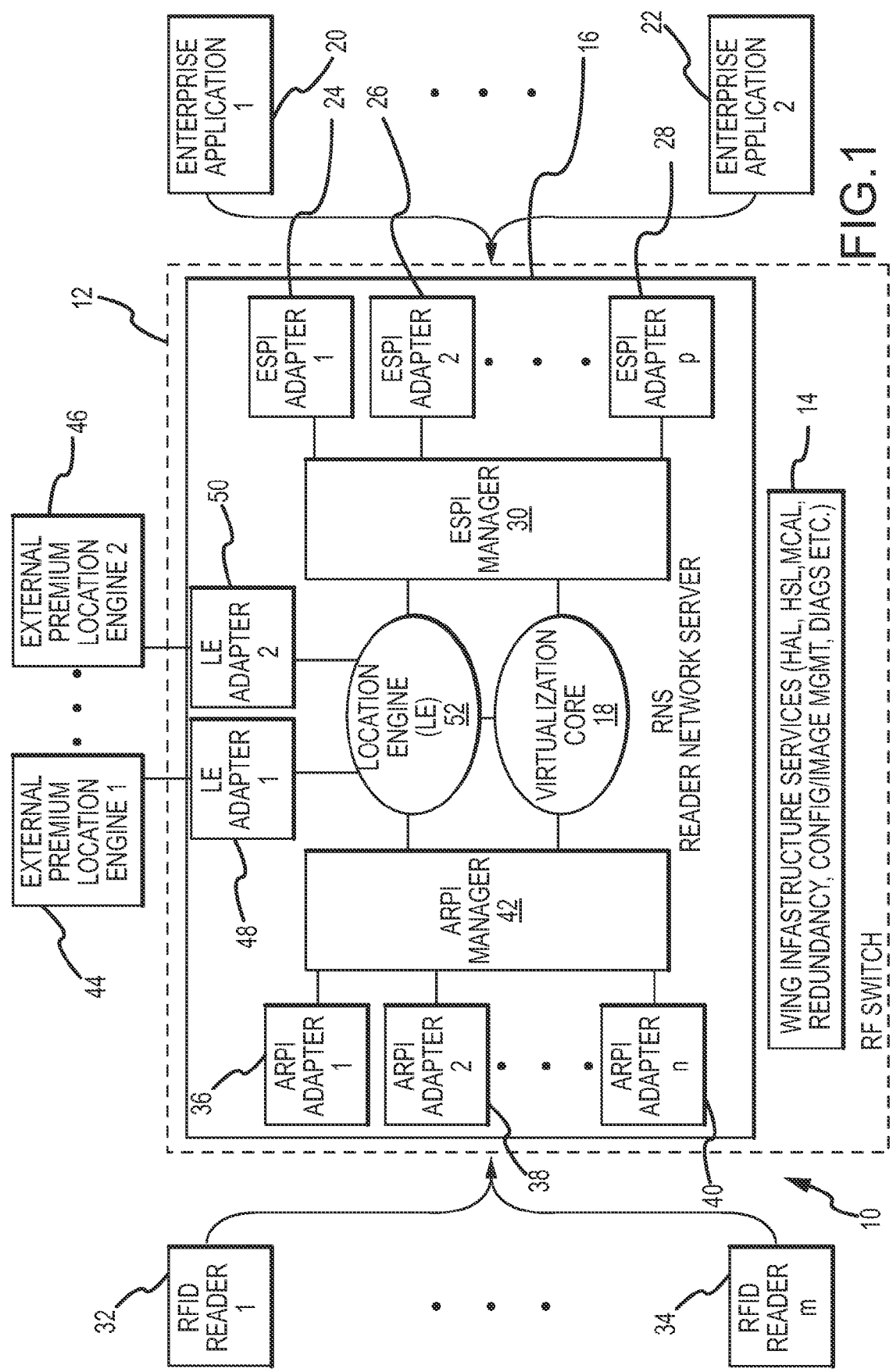
FIG. 1 is a block diagram of an exemplary radio frequency (RF) switch device.

The following description and claimed subject matter relates to an apparatus, system and computer program product for facilitating communication between an RF switch, an external location engine, and a variety of differing RF devices (wireless assets). In this regard, the following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

Embodiments of the invention may be described herein in terms of functional and/or logical block components and various processing steps. For example, an embodiment of the invention may employ various integrated circuit components, e.g., memory elements, digital signal processing elements, logic elements, look-up tables, or the like, that may carry out a variety of functions under the control of one or more microprocessors or other control devices. In addition, those skilled in the art will appreciate that embodiments of the present invention may be practiced in conjunction with any number of data transmission and data formatting protocols and that the system described herein is merely one example embodiment of the invention.

For the sake of brevity, conventional techniques related to signal processing, data transmission, signaling, network control, the 802.11 family of specifications, wireless networks, RFID systems and specifications, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. The term "exemplary" is used in the sense of "example," rather than "model." Although the figures may depict example arrangements of elements, additional intervening elements, devices, features, or components may be present in an embodiment of the invention.

In the following description, an apparatus, system and computer program product is presented for facilitating communication between an RF switch, an external location engine, and a number of wireless assets. Location engines may be hardware, firmware, or a combination of hardware and firmware that use a variety of methodologies to locate an associated wireless asset. For example, the Texas Instruments® ("TI") CC2431 location engine is designed to be compatible with the Zigbee specification. The TI location engine incorporates a processor that calculates a location of an associated wireless asset based on a location algorithm using so-called "Received Signal Strength Indicator" (RSSI) values.

As one skilled in the art will appreciate, however, a variety of location technologies, including so-called "Angle of Arrival" (AOA), "Time Difference of Arrival" (TDOA), and "Time of Arrival" (TOA) may be also utilized in location engines. A variety of differing wireless assets may coexist in a single location, such as a floor plan. Again, such assets may be associated with a variety of differing RF technologies, including the technologies, standards, and specifications described previously. A group of wireless assets sharing a technology, such as Zigbee, may be associated with a location engine. For example, the TI engine discussed above may have the capability of locating all Zigbee wireless assets within its range.

In a location where a variety of wireless assets are positioned, a network component such as an RF switch may be deployed, according to the description below, to efficiently facilitate communication between the wireless assets and other network components. RF switches can be thought of as network switches which are used to connect wireless portions of networks. As will be further described, such an RF switch may be configured to be modular in design, and compatible with open standards. For example, applications operational on the switch component may interact using standard based interfaces such as Automatic Link Establishment (ALE) versions 1.0 and/or 1.1. In another example, RF devices such as RFID readers may interact with the switch using standard based interfaces such as the Low Level Reader Protocol (LLRP).

The switch can be configured to be third party friendly. For example, the switch may provide infrastructure for loadable modules (software or firmware) for RF devices and applications. The switch may be configured to be scalable, and adaptable for large or smaller sites with a variety of wireless assets. Finally, the switch may be configured to be extendible and adaptable, designed for minimum disruption to already deployed infrastructures, particularly in the case of newer RF technologies.

In light of the foregoing, the switch may be configured, as will be further described, to support a wide variety of wireless assets. These include passive tags providing fixed reader support, passive tags providing mobile reader support, active tags (such as 802.11 tags), semi-passive, active, and sensor tags, and wireless assets compatible with such standards as the aforementioned WiMAX.

As will be further described, the switch may leverage a processor such as an onboard location engine, depending upon the respective implementation, to provide locationing information for certain wireless assets. The location engine may be integrated into the switch itself. In addition, at least one adapter may couple the location engine to an external location engine. The switch may include a variety of hardware and software interfaces that allow the various wireless assets to be configured, depending upon the asset. Finally, a variety of operational and control techniques may be implemented in accordance with the switch to facilitate the locationing of various wireless assets, as discussed below.

FIG. 1 is an exemplary system 10 for locationing various types of wireless assets. System 10 facilitates communication between an RF switch and an external location engine. System 10 includes an RF switch 12. RF switch 12 acts as a conduit for data between wired portions of a network and wireless portions. In one embodiment, the switch 12 interfaces the wireless portion of a network with the wired portion. Switch 12 includes a variety of subcomponents, infrastructure, and related applications as will be further described below.

Wireless next generation operating system (WING) infrastructure services 14 provides a common infrastructure and operating system (OS) services layer across all platforms of the switch 12. The WING layer 14 refers in the abstract to various details of a specific switch 12 hardware platform. WING 14 includes infrastructure and configuration management functionality for the operation of the switch 12. A reader network server (RNS) 16 integrated into the switch acts as a nerve center for data and applications from each of a variety of wireless assets.

A virtualization core 18 normalizes the wireless assets of a particular site. Through software, hardware, firmware, or a combination thereof, the virtualization core 18 enables the switch 12 to view and communicate with all wireless assets found in the site. The core 18 allows for a common interface for all applications. A series of enterprise applications (e.g., enterprise applications 20 and 22) provide data through a series of enterprise services programming interface (ESPI) adapters (e.g., adapters 24, 26, and 28) to the core 18. These enterprise applications may be specific to a particular type of wireless asset. In one embodiment, a respective enterprise application 20 is dedicated to a respective interface. For example, application 20 may be dedicated to adapter 24 to provide data through the interface to/from the switch 12. An ESPI manager 30 serves as a controller, managing the transfer of data between the core 18 and various applications.

A series of RFID readers (e.g., RFID reader 32 and 34) in communication with RFID tag wireless assets provide data through a series of adaptive reader programming interface (ARPI) adapters (e.g., adapters 36, 38, and 40) to the core 18. An ARPI manager 42 serves as a controller, managing the transfer of data between the core 18 and various RFID readers.

Specific wireless assets may be associated with various manufacturers. One manufacturer may have an associated external location engine 44. Additionally, another manufacturer may have an associated external location engine 46. In other words external location engine 44 may originate from a different source than external location engine 46. These external location engines may be used to perform a site survey and locationing of related wireless assets affiliated with the particular manufacturer.

External location engines are coupled through a location engine (LE) adapter (e.g., adapters 48 and 50) to the switch 12. In the depicted embodiment, switch 12 incorporates an onboard location engine 52. Adapters 48 and 50 are thereby coupled to location engine 52. Location engine (LE) 52 provides an open platform for supporting new architectures, future algorithms or newer RF asset types. LE 52 provides a standard way of communicating with external premium location engines 44 and 46. The LE adapters 48 and 50 encapsulate any proprietary details for external engines and provide data to LE 52 using the standard method called LE application programming interfaces (APIs).

Each external location engine (e.g., LE 44 and 46) deals with a particular RF asset. The intricacies for a particular RF asset are hidden within the LE adapter for a respective external location engine. As a result, LE 52 does not need to change to support a particular type of RF asset. With the development of new LE adapters adhering to published standards such as the aforementioned LE APIs, any RF asset can be integrated with RF switch 12. Location Engine 52 allows for configuration of an external location engine. This configuration is propagated to the external location engine using LE adapters. Location specific data such as x,y,z coordinates, and time of read data including any opaque data from RF assets, is communicated to LE 52 from LE adapters 48 and 50.

Location engine 52 may provide locationing of a particular wireless asset, or may leverage external wireless assets for location data, that is then in turn provided to the core 18. In this way, the switch 12 can communicate with and manage a variety of wireless assets in a particular site.

Location engine 52 may make use of a combination of mathematical algorithms to determine a location of a wireless asset based on the asset type. The engine 52 may fuse the location information reported by several technologies into a seamless environment (interpreted by the switch 12) to integrate the various technologies.

Location engine 52 may be configured, again through software, hardware, firmware, or a combination thereof, to determine the location of various types of wireless assets, such as passive tags, semi-passive tags, active tags (e.g., ultra wide band (UWB), 802.11, RFID, etc.), wireless stations, and other wireless devices. LE 52 may use of a combination of various algorithms to determine location based on asset type and fuse the location information reported by several technologies into one seamless environment to get more meaningful results. LE 52 may use a combination of input variables to calculate the location of the asset. These input variables may include facility layout, barrier information, runtime RF environment changes, smart surroundings, previous position of the asset, and business rules. LE 52 can implement a self learning process that minimizes the training phase and automatically adapts with the changing environment.

The engine 52 may leverage information, such as the data obtained from RFID readers 32 and 34, to provide a more accurate location of passive tags. For example, the passive tags may be read by the RFID readers 32 and 34, who provide antenna direction/location data of the tag. The switch then may combine this antenna direction/location data with 802.11 location data of the RFID readers as determined by the switch. The combined data provides increased resolution of an asset location.

As will be further described, enterprise applications may provide the RF switch (including engine 52 and/or core 18) with data regarding a particular site, such as a facility map, a location of various portions of infrastructure, or a so-called "zone." A zone may refer to an area that is of specific interest to a user with respect to whenever an asset becomes visible or invisible in that area.

The RF switch then may configure location specifications relating to the particular asset or group of assets. The RF switch may then report the configuration information through an industry standard interface such as ALE to a user. In calculating a location of an asset, the RF switch may use a variety of input variables applicable to the specific asset. These input variables may include training data or a user configuration, RSSI propagation based on facility layout or RF barriers, the presence of fixed wireless devices such as printers, price verifiers, so-called "near me" tags as preinstalled in the facility, the respective runtime RF environment of the site, a previous position of the asset, or locationing parameters such as TDoA or AoA. Again, the RF switch and related internal components may also leverage external location data supplied by the external location engines 44 and 46.

Figure 2:
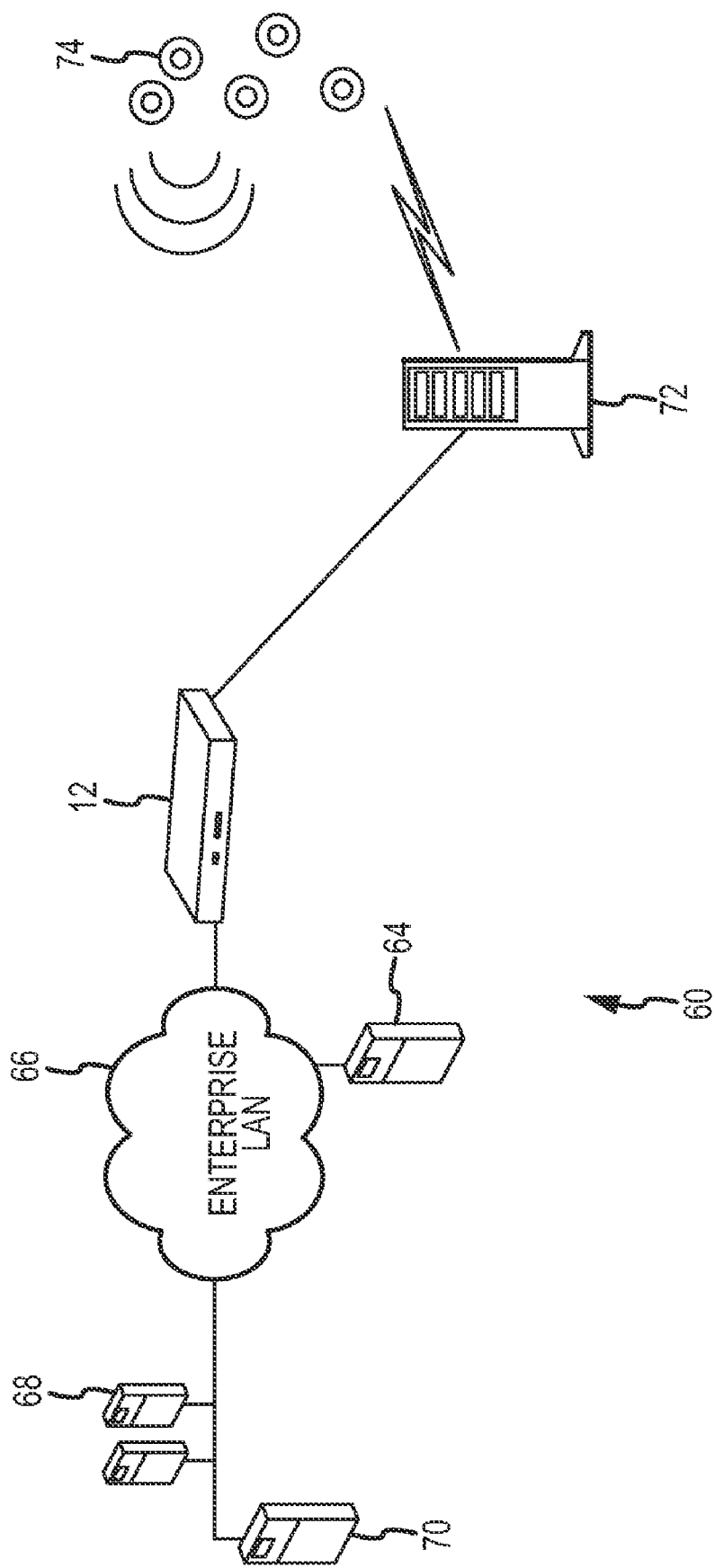
FIG. 2 is a first exemplary network having wired and wireless portions.

To illustrate the flexibility of the RF switch in various network implementations, a series of exemplary network configurations is presently described. FIG. 2 illustrates an exemplary network configuration 60 that includes wireless assets from a particular manufacturer. RF switch 12 is shown, coupled to an enterprise local area network (LAN) 66. A series of wired servers 68 are coupled to the LAN 66. An RFID enterprise application is operational on server 70 and shown coupled to the wired servers 68 and LAN 66. Enterprise application on server 70 may include portions of software that executes on wired servers 68 or elsewhere. The application on server 70 interfaces with switch 12 as previously described. An external location engine 64 is coupled to the LAN 66, as well as an access point 72. Access point 72 receives an RF signal from a number of active tags 74. Tags 74, as well as location engine 64 and access point 72 may be provided from a single manufacturer or from differing manufacturers.

In addition to the network configuration depicted by FIG. 2, and as one skilled in the art will appreciate, switch 12 may be configured in a variety of settings (wired or wireless) in communication with a variety of wireless devices. In addition, the adaptability of switch 12 allows for configurations that may utilize a combination of the depicted configurations. In other words, several manufacturers of wireless assets (including associated technologies) may be integrated using the wireless switch.

Figure 3:
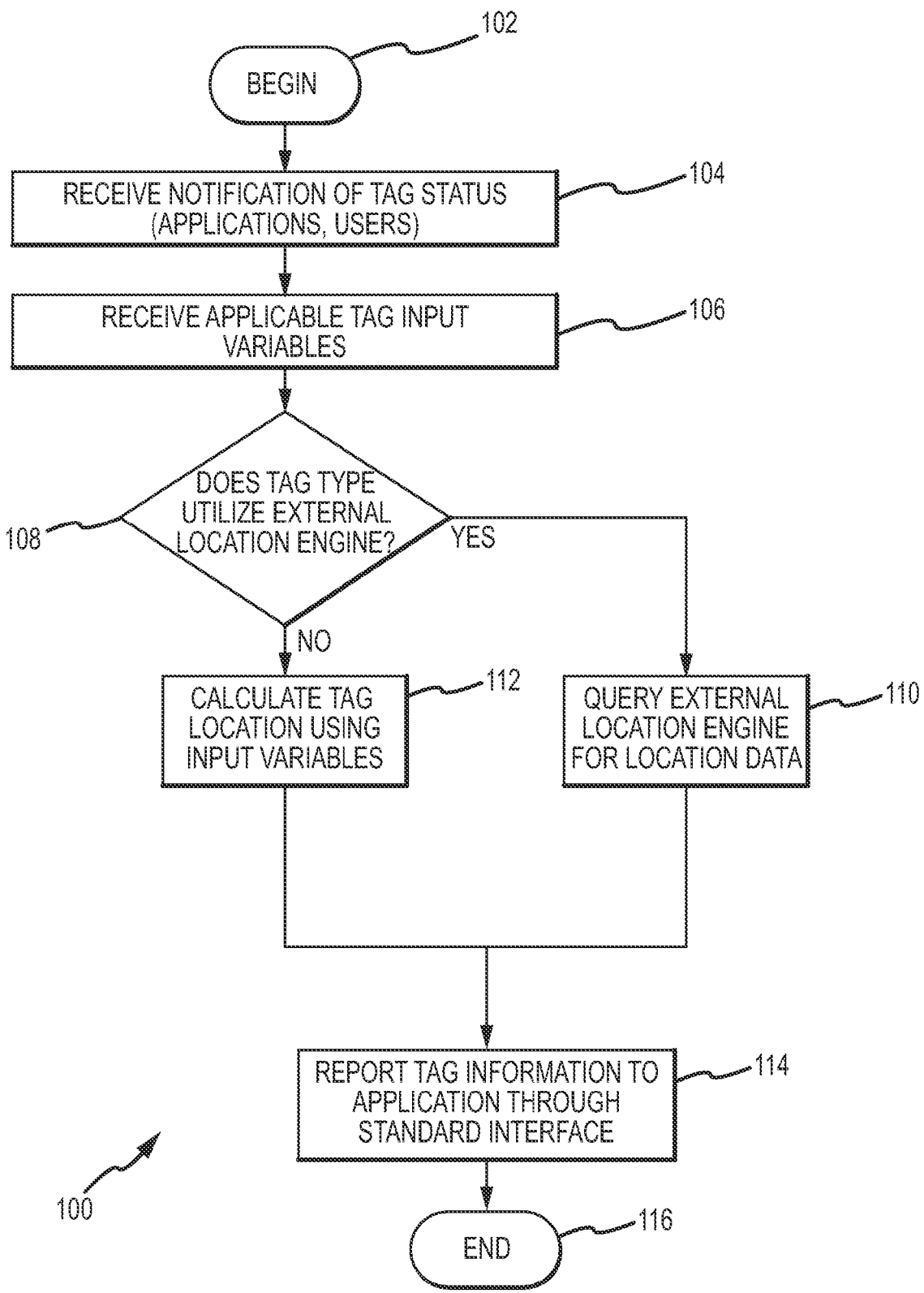
FIG. 3 is an exemplary method of facilitating communication between an RF switch and an external location engine.

FIG. 3 refers to an exemplary method of operation for the processing component associated with an RF switch, pursuant to the foregoing discussion. Method 100 describes an exemplary locationing operation which may be performed by the RF switch to better facilitate communication between the RF switch, a possible external location engine, and a variety of wireless assets. Method 100 may be performed in a situation where a variety of wireless assets are newly introduced into an existing network. Accordingly, the RF switch operates to discover the wireless assets and better integrate them into the network.

In a first step, method 100 begins (step 102) by receiving information (such as a notification) of a status of a wireless asset, such as an active tag (step 104). Such information may be provided using one or more enterprise applications in communication with the switch. The switch may receive information that that the particular asset is now visible. Additional information may also be received in a preliminary matter by the switch, such as the aforementioned infrastructure locations, facility maps, and zones.

As a next step, the switch receives at least one applicable input variable associated with the wireless asset (step 106). This input variable can include such variables as training data or configuration data, RSSI propagation data based on a facility layout and RF barriers, the existence of any fixed wireless devices such as a printer, price verifier, so-called "near me" tags, or other devices, the applicable RF environment, a previous position of the asset and any applicable rules, and location-related parameters such as TDoA and ToA parameters associated with the wireless asset.

Method 100 queries whether the particular wireless asset utilizes (or is otherwise associated with) an external location engine (step 108). If so, the method queries the external location engine for any applicable locationing data of the asset (step 110). The data may be provided to the switch via the location engine adapter integrated into the switch.

If the wireless asset is not found to be associated with an external location engine, an onboard location engine analyzes the various input variables (again, such as ToA or TDoA parameters) to determine a location of the asset (step 112). Once the location is identified, then data representing the location may be passed internally through the switch to one of several possible locations. For example, the location data may be passed through the ESPI manager 30 (FIG. 1) through an ESPI adapter (e.g., adapter 24) to an applicable enterprise application (e.g., enterprise application 20). In one embodiment, the information may be normalized passed to an enterprise application through an industry standard interface such as the previously described ALE interface. The interface then processes the data into the format compatible with the particular enterprise application, where it is then displayed to a user. The user may then use the enterprise application to communicate with the wireless asset, such as performing a configuration task.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. An RF switch, comprising:
    a processor adapted for communication with a plurality of location engines, each of the plurality of location engines configured to collect location data from at least one type of wireless asset, the processor further configured to:
        receive notification regarding a status of a wireless asset,
        receive a plurality of input variables associated with the wireless asset,
        determine whether the wireless asset is associated with one of the plurality of external location engine based upon a type associated with the wireless asset, and
        if the wireless asset is associated with one of the plurality of external location engines, query the corresponding external location engine for location data associated with the wireless asset.

2. The RF switch of claim 1, further including an adapter adapted to couple between the plurality of external location engines and the processor for providing a network interface between the plurality of external location engines and the processor.

3. The RF switch of claim 1, wherein the processor is further configured to, if the wireless asset is not associated with one of the plurality of external location engines, calculate a location of the wireless asset using the plurality of input variables.

4. The RF switch of claim 1, wherein the processor is further configured to report location information of the wireless asset to a user.

5. The RF switch of claim 4, further including an interface operational on the processor for facilitating reporting of the location information to the user.

6. The RF switch of claim 1, further including a location engine, compatible with the wireless asset, integrated into the processor.

7. The RF switch of claim 1, wherein the wireless asset includes a passive, semi-passive or active radio frequency (RF) tag, a radio frequency identification (RFID) tag, a wireless station, or an access point.

8. The RF switch of claim 1, wherein the processor is further configured to determine the location of a passive radio frequency identification (RFID) tag by combining data representative of a location of an RFID reader with data representative of antenna power and direction of the tag.

9. A system for facilitating communication between an RF switch and a plurality of external location engines, each of the plurality of location engines configured to collect location data from at least one type of wireless asset, comprising:
    means for receiving notification from a network resource regarding a status of a wireless asset;
    means for receiving a plurality of input variables associated with the wireless asset from the network resource;
    means for determining whether the wireless asset is associated with the on of the plurality of external location engines based upon a type associated with the wireless asset; and
    means for querying a corresponding external location engine for location data associated with the wireless asset if the wireless asset is associated with one of the plurality of external location engines.

10. The system of claim 9, further including means for operating a network interface between the plurality of external location engines and the processor.

11. The system of claim 9, further including means to, if the wireless asset is not associated with one of the plurality of external location engines, calculate a location of the wireless asset using the plurality of input variables.

12. The system of claim 9, further including means to report location information of the wireless asset to a user.

13. The system of claim 12, further including means to facilitate reporting of the location information to the user using an interface.

14. The system of claim 9, wherein the plurality of input variables includes training data, a user configuration, a RF barrier specified by a user, a signal propagation characteristic, a time difference of arrival (TDoA) parameter, a time of arrival (TOA) parameter, an angle of arrival (AoA) parameter, or a previous position of the wireless asset.

15. The system of claim 9, wherein the wireless asset includes a passive, semi-passive or active radio frequency (RF) tag, a radio frequency identification (RFID) tag, a wireless station, or an access point.

16. A computer program product, comprising: a non-transitory computer-readable medium having computer-readable code embodied therein for facilitating communication between an RF switch and a plurality of external location engines, each of the plurality of location engines configured to collect location data from at least one type of wireless asset, the computer program product comprising:
    a first executable computer-readable code configured to cause a computer processor to receive notification from a network resource regarding a status of a wireless asset;
    a second executable computer-readable code configured to cause the computer processor to receive a plurality of input variables associated with the wireless asset from the network resource;
    a third executable computer-readable code configured to cause the computer processor to determine whether the wireless asset is associated with one of the plurality external location engines based upon a type associated with the wireless asset, and
    a fourth executable computer-readable code configured to cause the computer processor to query a corresponding external location engine for location data associated with the wireless asset if the wireless asset is associated with the corresponding external location engine.

17. The computer program product of claim 16, further including a fifth executable computer-readable code configured to cause the computer processor to operate a network interface between the plurality of external location engines and the processor.

18. The computer program product of claim 16, further including a fifth executable computer-readable code configured to cause the computer processor to calculate a location of the wireless asset using the plurality of input variables.

19. The computer program product of claim 16, further including a fifth executable computer-readable code configured to cause the computer processor to report location information of the wireless asset to a user.

20. The computer program product of claim 19, further including a sixth executable computer-readable code configured to cause the computer processor to facilitate reporting of the location information to the user using an interface.

21. The computer program product of claim 16, wherein the plurality of input variables includes training data, a user configuration, a RF barrier specified by a user, a signal propagation characteristic, a time difference of arrival (TDoA) parameter, a time of arrival (TOA) parameter, an angle of arrival (AoA) parameter, or a previous position of the wireless asset.

* * * * *